United States Patent
Choi et al.

(10) Patent No.: US 7,443,904 B2
(45) Date of Patent: Oct. 28, 2008

(54) SCRAMBLING SYSTEM AND METHOD FOR PEAK POWER REDUCTION IN MC-CDMA, AND RECORDING MEDIUM FOR STORING CORRESPONDING PROGRAM

(75) Inventors: Kwon-Hue Choi, Daejeon (KR); Kun-Seok Kang, Daejeon (KR); Soo-Young Kim, Daejeon (KR); Deock-Gil Oh, Daejeon (KR)

(73) Assignees: Electronics and Telecommunications Research Institute (KR); VK Corporation (KR)

( * ) Notice: Subject to any disclaimer, the term of this patent is extended or adjusted under 35 U.S.C. 154(b) by 508 days.

(21) Appl. No.: 10/699,224

(22) Filed: Oct. 30, 2003

(65) Prior Publication Data
US 2004/0128533 A1 Jul. 1, 2004

(30) Foreign Application Priority Data
Dec. 23, 2002 (KR) ...................... 10-2002-0082858

(51) Int. Cl.
*H04B 1/00* (2006.01)
(52) U.S. Cl. ...................................... 375/130; 380/268
(58) Field of Classification Search ................ 375/130, 375/140, 141, 146, 147; 370/342, 335, 203, 370/210, 208; 380/33, 255, 268
See application file for complete search history.

(56) References Cited

U.S. PATENT DOCUMENTS

| 6,175,551 | B1 | 1/2001 | Awater et al. |
| 6,584,068 | B1 * | 6/2003 | Alard ......................... 370/208 |
| 7,028,246 | B2 | 4/2006 | Kim et al. |
| 2002/0118727 | A1 * | 8/2002 | Kim et al. ................... 375/146 |
| 2003/0095585 | A1 * | 5/2003 | Huh et al. ................... 375/140 |
| 2004/0151255 | A1 * | 8/2004 | Riazi et al. ................. 375/260 |

OTHER PUBLICATIONS

Thilak Ginige, "Dynamic Spreading Code Selection Method for PAPR... With 4-QAM Modulation", IEEE Communications Letters, vol. 5, No. 10, Oct. 2001.

* cited by examiner

*Primary Examiner*—Jean B. Corrielus
(74) *Attorney, Agent, or Firm*—Blakely, Sokoloff, Taylor & Zafman

(57) ABSTRACT

Disclosed is an MC-CDMA scrambling system and method, and a recording medium for storing a program thereof. A transmitter receives user's bit streams, uses a fixed scrambling code, determined according to the user's orthogonal code combinations or the number of users and having a length equal to the number of subcarriers, and generates and outputs multicarrier signals. A receiver uses the scrambling code equal to that used by the transmitter, and receives the multicarrier signals from the transmitter, thereby converting the scrambling codes according to the users' orthogonal code combinations irrespective of user data, and easily reducing the PAPR (peak-to-average power ratio).

15 Claims, 5 Drawing Sheets

SCRAMBLING SYSTEM AND METHOD FOR PEAK POWER REDUCTION IN MC-CDMA, AND RECORDING MEDIUM FOR STORING CORRESPONDING PROGRAM

CROSS REFERENCE TO RELATED APPLICATION

This application is based on Korea Patent Application No. 2002-82858 filed on Dec. 23, 2002 in the Korean Intellectual Property Office, the content of which is incorporated herein by reference.

BACKGROUND OF THE INVENTION (a) Field of the Invention

The present invention relates to a scrambling system and method in MC-CDMA (multicarrier code-division multiple access), and a recording medium for storing its program. More specifically, the present invention relates to a scrambling system and method in MC-CDMA for reducing PAPR (peak-to-average power ratio) and improving link performance.

(b) Description of the Related Art

In the first prior art, methods for reducing the PAPR include a PTS (partial transmit sequence) method used for OFDM (orthogonal frequency division multiplexing), which is a non-spreading multicarrier system, and a method for applying the SM (selective mapping) method to the MC-CDMA system.

The methods according to first prior art reduce the PAPR, but they further require an individual operation for reducing the PAPR for each transmission symbol, and transmit corresponding additional information to a receiver.

In the second prior art, the methods for reducing the PAPR in the MC-CDMA system include a method for allowing a transmitter and a receiver to selectively use a user's orthogonal code and reduce a mean power in a MC-CDMA system that performs no scrambling process.

The second prior art is applied to systems that do not perform the scrambling, but most of the CDMA systems use scramble codes.

In general, the system that performs scrambling reduces the PAPR further than the system that does not perform scrambling, irrespective of the user's code combination.

Therefore, the second prior art fails to acquire practical effects of PAPR reduction in the case of the system that performs scrambling.

SUMMARY OF THE INVENTION

It is an object of the present invention to provide a scrambling system and method, and a recording medium for storing its program for converting scrambling codes according to the combination of user's orthogonal codes to reduce the PAPR.

In one aspect of the present invention, a scrambling system in MC-DCMA comprises: a transmitter for receiving a user's bit stream, using a fixed scrambling code which is predetermined according to the user's orthogonal code or a number of users, generating multicarrier signals, and outputting them; and a receiver for using a scrambling code matched with the scrambling code used by the transmitter, and receiving the multicarrier signals from the transmitter.

The scrambling code multiplied to each subcarrier by the transmitter uses a predetermined pattern established according to the user's orthogonal code combination and it is fixed while the identical user's orthogonal code combination is maintained.

The transmitter comprises: a symbol modulator for receiving a bit stream of a k-th user, and modulating the same according to a modulation method determined by the system; a multiplier for multiplying respective modulation symbols modulated by the symbol modulator by an orthogonal code $C_k$ having an N chip length, and spreading them into chip sequences; an adder for adding the users' chip sequences spread by the multiplier in synchronization with symbol timing; an interleaver for interleaving the chip sequences of M symbols added by the adder and arranging the chips belonging to an identical symbol by an M chip interval; a serial/parallel converter for converting the chip sequences of the symbols arranged by the interleaver into parallel chip signals with a size identical to the number of subcarriers; a scrambling chip vector generator for providing scrambling codes having a length identical to the number of subcarriers to the parallel chip signals of the serial/parallel converter, and multiplying them chip by chip; an inverse fast Fourier transformer (IFFT) for performing inverse fast Fourier transform for the scrambled chip signals; and a signal generator for generating baseband multicarrier signals from the outputs of the IFFT.

The scrambling chip vector generator includes a multiplier for multiplying the parallel chip signals of the serial/parallel converter by the scrambling codes.

The signal generator comprises: a parallel/serial converter for converting the parallel chip signals converted by the IFFT into serial chip signals; and a guard time inserter for inserting guard time into the serial chip signal converted by the parallel/serial converter.

The scrambling code satisfies a condition for minimizing the PAPR performance measure, PAPRo which is defined according to the subsequent equation:

$$Pr\left\{ \frac{\max\limits_{0 \leq t < T_s} |y(t)|^2}{E(|y(t)|^2)} > PAPR_0 \right\} = P_0$$

where y(t) is an output signal of the transmitter, $T_s$ is a symbol period and $P_0$ is the output signal clipping probability which is specified according to the system requirement.

The transmitter finds a fixed scrambling pattern for maintaining the PAPR to be a minimum value for the current user's orthogonal code combinations, and uses the scrambling code while the user's orthogonal code combination is maintained.

The fixed scrambling pattern is selected to minimize the performance difference of the PAPR from the optimal scrambling patterns which are respectively optimized at each code combination, over all code combinations before operating the system.

In another aspect of the present invention, a scrambling method in MC-CDMA comprises: (a) a transmitter receiving a user's bit stream, using a fixed scrambling code which is predetermined according to the user's orthogonal code or a number of users, generating multicarrier signals, and outputting them; and (b) a receiver using a scrambling code matched with the scrambling code used by the transmitter in (a), and receiving the multicarrier signals from the transmitter.

The scrambling code multiplied to each subcarrier in (a) uses a predetermined pattern established according to a current user's orthogonal code combination and it is fixed while the identical user's orthogonal code combination is maintained.

The step (a) comprises: (a-1) modulating bit streams of a k-th user into modulation symbols, multiplying the respective modulation symbols by an orthogonal code $C_k$, and spreading them into chip sequences; (a-2) adding the users' chip sequences spread in (a-1) in synchronization with symbol timing, interleaving the chip sequences of M symbols that will be transmitted in parallel, and arranging the chips belonging to an identical symbol by an M chip interval; and (a-3) converting the chip sequences arranged in (a-2) into parallel chip signals having a number of subcarriers, multiplying the parallel chip signals by the scrambling code, modulating each chip for each subcarrier through inverse fast Fourier transform, and generating and outputting multicarrier signals.

The generation of the multicarrier signals in (a-3) comprises multiplying the scrambling codes by the parallel chip signals input for inverse fast Fourier transform for each chip.

The scrambling code satisfies a condition for minimizing the PAPR performance measure, PAPRo which is defined according to the subsequent equation:

$$Pr\left\{\frac{\max_{0 \leq t < T_s} |y(t)|^2}{E(|y(t)|^2)} > PAPR_0\right\} = P_0$$

where y(t) is an output signal of the transmitter, $T_s$ is a symbol and $P_0$ is the output signal clipping probability which is specified according to the system requirement.

The transmitter finds a fixed scrambling pattern for maintaining the PAPR to be a minimum value for the user's orthogonal code combinations, and uses the scrambling code while the user's orthogonal code combination is maintained.

The fixed scrambling pattern is selected to minimize the performance difference of the PAPR from the optimal scrambling patterns which are respectively optimized at each code combination, over all code combinations before operating the system.

In still another aspect of the present invention, a recording medium storing a program comprises: (a) modulating bit streams of a k-th user into modulation symbols, multiplying the respective modulation symbols by an orthogonal code $C_k$, and spreading them into chip sequences; (b) adding the users' chip sequences spread in (a) in synchronization with symbol timing, interleaving the chip sequences of M symbols that will be transmitted in parallel, and arranging the chips belonging to an identical symbol by an M chip interval; and (c) converting the chip sequences arranged in (b) into parallel chip signals, multiplying the parallel chip signals by the scrambling code, modulating each chip for each subcarrier through inverse fast Fourier transform, and generating and outputting multicarrier signals.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

In the multicarrier CDMA method, orthogonal codes provided to each user are used to spread the user's data symbol, and multicarriers having different central frequencies are used to transmit a user signal.

In the general CDMA system, spread chip sequences are scrambled so as to improve statistical features of transmission signals and distinguish signal sources. The conventional CDMA system uses scrambling codes independently generated irrespective of the user's orthogonal codes or data.

In the MC-CDMA method, since the chips corresponding to the identical symbol are respectively loaded to different carriers and transmitted, and hence when no scrambling is executed, a high correlation exists between the carriers according to the user's orthogonal codes or a combination of the orthogonal codes, and accordingly, the PAPR values are greatly varied.

Therefore, in the preferred embodiment of the present invention, scrambling codes are used so as to disturb the correlation between the carriers and reduce the PAPR. That is, predetermined scrambling codes are selected depending on the user's combination, to thereby disturb the correlations between the carriers and reduce the PAPR.

Figure 1:
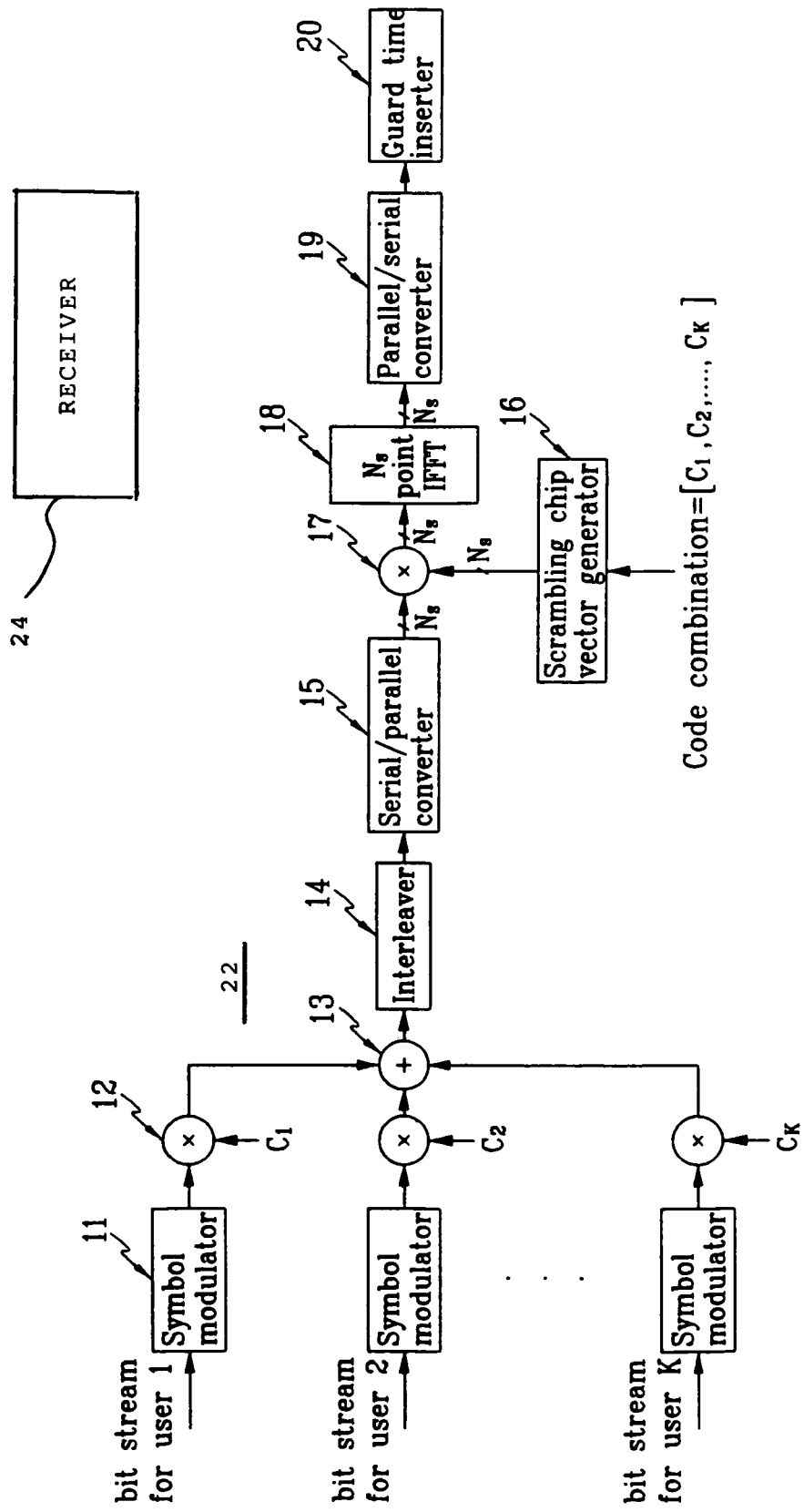
FIG. 1 shows a configuration of a baseband transmitter in a scrambling system in MC-CDMA according to a preferred embodiment of the present invention.

FIG. 1 shows a configuration of a baseband transmitter 22 in a scrambling system in MC-CDMA according to a preferred embodiment of the present invention.

As shown, the transmitter 22 comprises a symbol modulator 11, a multiplier 12, an adder 13, an interleaver 14, a serial/parallel converter 15, a scrambling chip vector generator 16, a multiplier 17, an IFFT (inverse fast Fourier transformer) 18, a parallel/serial converter 19, and a guard time inserter 20.

The symbol modulator 11 receives bit streams of the k-th user, and modulates them according to a modulation method determined by a system. The multiplier 12 multiplies respective modulation symbols modulated by the symbol modulator 11 by an orthogonal code $C_k$ having a length N, to spread them into chip sequences.

The adder 13 adds the users' chip sequences spread by the multiplier 12 in synchronization with a symbol timing. The interleaver 14 performs M:N interleaving on the chip sequences of M symbols that will be transmitted, and arranges the chips belonging to the identical symbol by an M chip interval.

The serial/parallel converter 15 converts the chip sequences of the symbols arranged by the interleaver into parallel chip signals having a length of $N_s$. The scrambling chip vector generator 16 provides a scrambling code, having a length identical to the number of subcarriers, to the parallel chip signals of the serial/parallel converter 15.

The multiplier 17 multiplies the parallel chip signals and the scrambling code chip by chip. The subcarriers are scrambled by multiplying the parallel chip signals input in parallel to the IFFT 18 by a scrambling code chip by chip.

The IFFT 18 receives the chip signals multiplied by the multiplier 17, and performs inverse fast Fourier transform on them to modulate each chip for each subcarrier.

The parallel/serial converter 19 converts the chip signals converted by the IFFT 18 into serial signals. The guard time inserter 20 inserts guard times into the serial signals converted by the parallel/serial converter 19.

Referring to FIG. 1, 'k' represents a number of users, 'N' shows a code length of an orthogonal user code, '$N_s$' indicates a number of subcarriers, '$M(=N_s/N)$' denotes a number of parallel transmission symbols, and '$C_k(=[C_k(1), C_k(2), \ldots, C_k(N)])$' represents an orthogonal code for the k-th user.

In the above, the scrambling code chip multiplied to each subcarrier follows a predetermined pattern established according to the user's orthogonal code combination, and the scrambling code is not changed but rather it is fixed while the same user's orthogonal code combination is maintained.

To receive correct data from a transmitter 22, a receiver 24 is required to use a scrambling code identical to the scrambling code used by the transmitter 22. Therefore, the transmitter 22 needs to notify the receiver 24 of information on the currently used scrambling code in advance.

The receiver 24 is required to know all the scrambling codes selectable by the transmitter 22, and since the more the number of users increases, the more the number of code combinations of the user becomes huge, and the number of the corresponding scrambling codes also becomes greater.

To complement this, the transmitter 22 and the receiver 24 find and use a single sub-optimum scrambling code for maintaining the PAPR values for the various users' orthogonal code combinations to be close to a minimum value.

Therefore, they search a scrambling code for minimizing the PAPR on the users' respective code combinations through simulation, and store and use the search results, before operating the system.

In this instance, in order to find an optimized scrambling code, the value obtained from Equation 1 is used as a PAPR performance measure PAPRo, and the scrambling code for minimizing the $PAPR_o$ is deemed to be an optimal value.

$$Pr\left\{\frac{\max_{0 \leq t < T_s} |y(t)|^2}{E(|y(t)|^2)} > PAPR_0\right\} = P_0 \quad \text{Equation 1}$$

Equation 1 satisfies the probability $P_o$ that the value obtained by dividing the maximum value of the output signals y(t) of the baseband transmitter 22 during a single symbol period $T_s$ by a mean value is greater than the PAPRo.

An operation of a scrambling system in MC-CDMA according to the preferred embodiment of the present invention will now be described.

Figure 2:
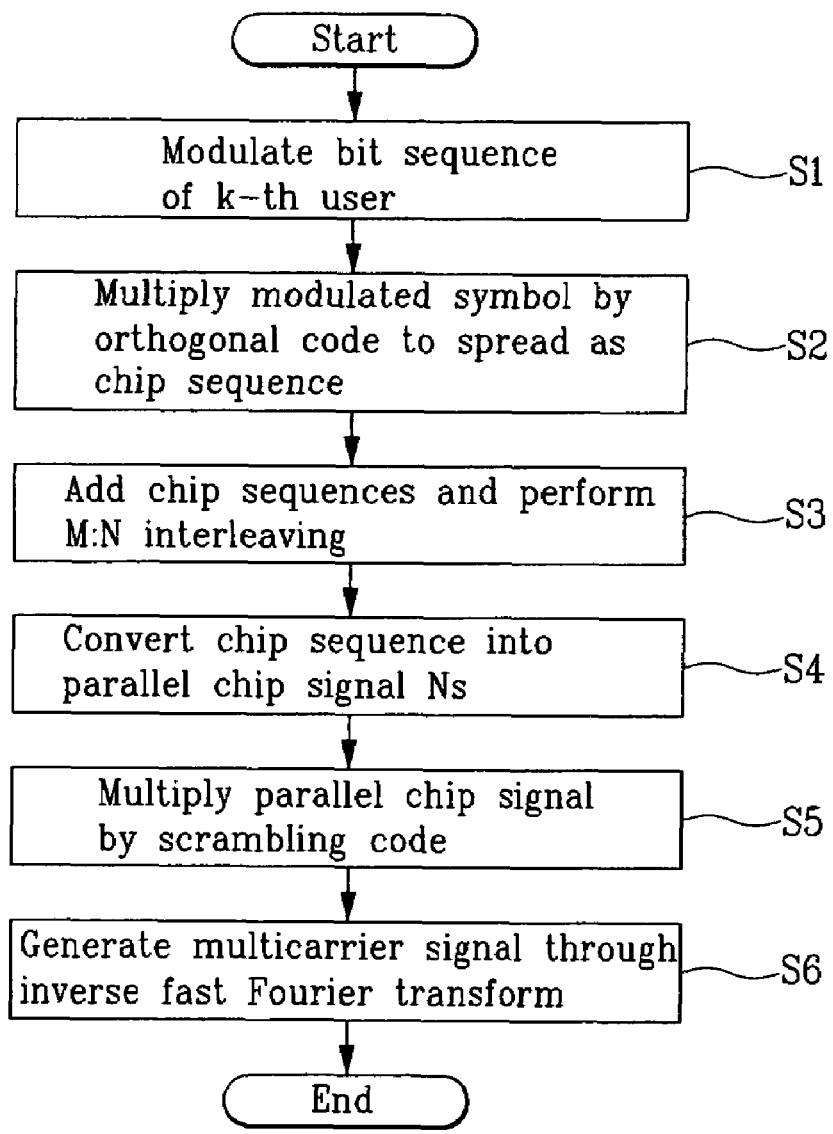
FIG. 2 shows a flowchart of a scrambling method in MC-CDMA according to a preferred embodiment of the present invention.

FIG. 2 shows a flowchart of a scrambling method in MC-CDMA according to a preferred embodiment of the present invention.

As shown, the symbol modulator 11 modulates the bit streams of a k-th user into modulation symbols in step S1, and the multiplier 12 multiplies the respective modulation symbols by an orthogonal code $C_k$ to spread them into chip sequences in step S2.

The adder 13 adds the spread chip sequences of the users in synchronization with the symbol timing, and the interleaver 14 interleaves the chip sequences of the M symbols that will be transmitted in parallel, and arranges the chips that form identical symbols by the M chip interval in step S3.

The serial/parallel converter 15 converts the chip sequences arranged by the interleaver 14 into parallel chip signals having a number of subcarriers in step S4, and the scrambling chip vector generator 16 through the multiplier 17 multiplies the parallel chip signals by the scrambling code, and transmits result signals to the IFFT 18 in step S5.

The IFFT 18, the parallel/serial converter 19, and the guard time inserter 20 modulate each chip for each subcarrier through the inverse fast Fourier transform process to generate and output multicarrier signals in step S6.

Figure 3:
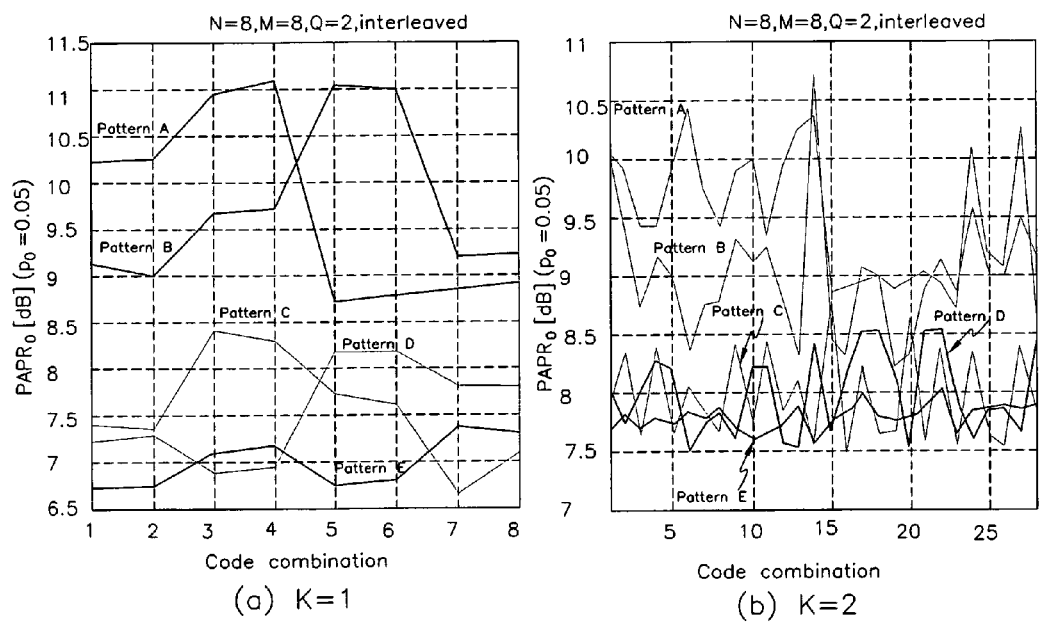
FIGS. 3(a) and 3(b) show PAPR performance in an MC-CDMA system, having a user number K as '1' in (a), and '2' in (b) respectively, a degree of an orthogonal code N as '8,' a parallel transmission symbol number M as '8,' and a modulation degree Q as '4'.

FIGS. 3(*a*) and 3(*b*) show graphs for PAPR values when using a fixed scrambling code according to the preferred embodiment of the present invention and a conventional unfixed random scrambling code.

FIGS. 3(*a*) and 3(*b*) show PAPR performance in an MC-CDMA system, having a user number K as '1' in (a), and '2' in (b) respectively, a degree of an orthogonal code N as '8,' a parallel transmission symbol number M as '8,' and a modulation degree Q as '4.'

FIG. 3(*a*) shows PAPRo values (Po=0.05) according to the user's orthogonal code combinations on the various scrambling patterns in the case of using the fixed scrambling code.

The PAPR values are measured on the 400 different patterns of scrambling codes for each user's orthogonal code combination, representing that the PAPR features are greatly changed depending on the patterns of the scrambling codes.

To check the PAPR features according to the patterns of the above-noted scrambling codes, FIG. 3 only shows results of five sample patterns from among the 400 patterns, showing that the PAPR values are greatly changed according to the users' orthogonal code combinations from the respective patterns of the scrambling codes.

Further, an optimal scrambling pattern individually exists in each user's orthogonal code combination. For example, in the case the number of the users K is '1,' the pattern E of the scrambling code is an optimal one when the first, second, fifth, and sixth orthogonal codes are used, and the pattern D of the scrambling code is an optimal one when the third, fourth, seventh, and eighth orthogonal codes are used.

Figure 4:
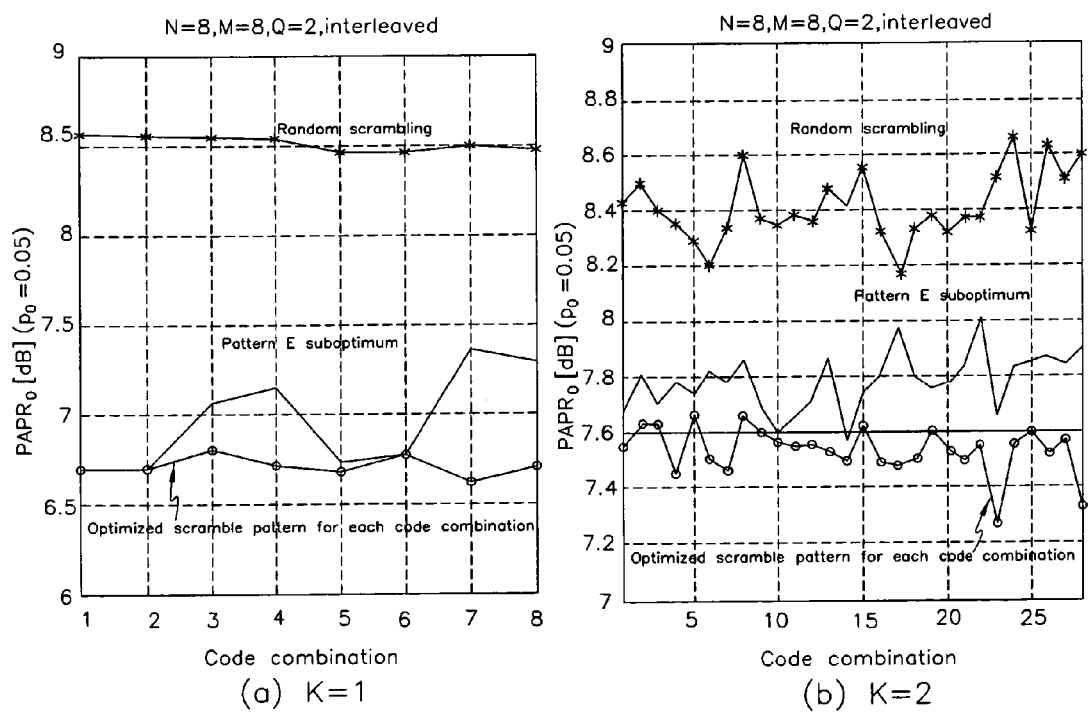
FIGS. 4(a) and 4(b) show graphs for comparing the PAPR performance between the case of selecting an optimized scrambling code from an orthogonal code combination for each user and the case of selecting an unfixed random scrambling code.

FIGS. 4(*a*) and 4(*b*) show graphs for comparing the PAPR performance between the case of selecting an optimized scrambling code for the user's orthogonal code combination and the case of employing an unfixed random scrambling code.

Referring to FIG. 4, the bottom line connected with the symbol "o" shows the PAPR performance assuming that the most optimized scrambling pattern is selected from the respective users' orthogonal code combinations, and the top line connected with the symbol "*" represents the PAPR performance in the case of employing an unfixed random scrambling code.

In the case of using an unfixed random scrambling code, it is assumed that the chips of the scrambling codes between the subcarriers, and between each symbol are independent.

As shown in FIG. 4, using a fixed scrambling pattern having a minimum PAPR according to the user's orthogonal code combination reduces the PAPR value by about one to two dB compared to the unfixed random scrambling.

In particular, the performance marked with a solid line represents a case of using the pattern E of the scrambling code, and this pattern is a fixed pattern for maintaining the PAPR value to be close to the minimum values over all the user's orthogonal code combination.

Figure 5:
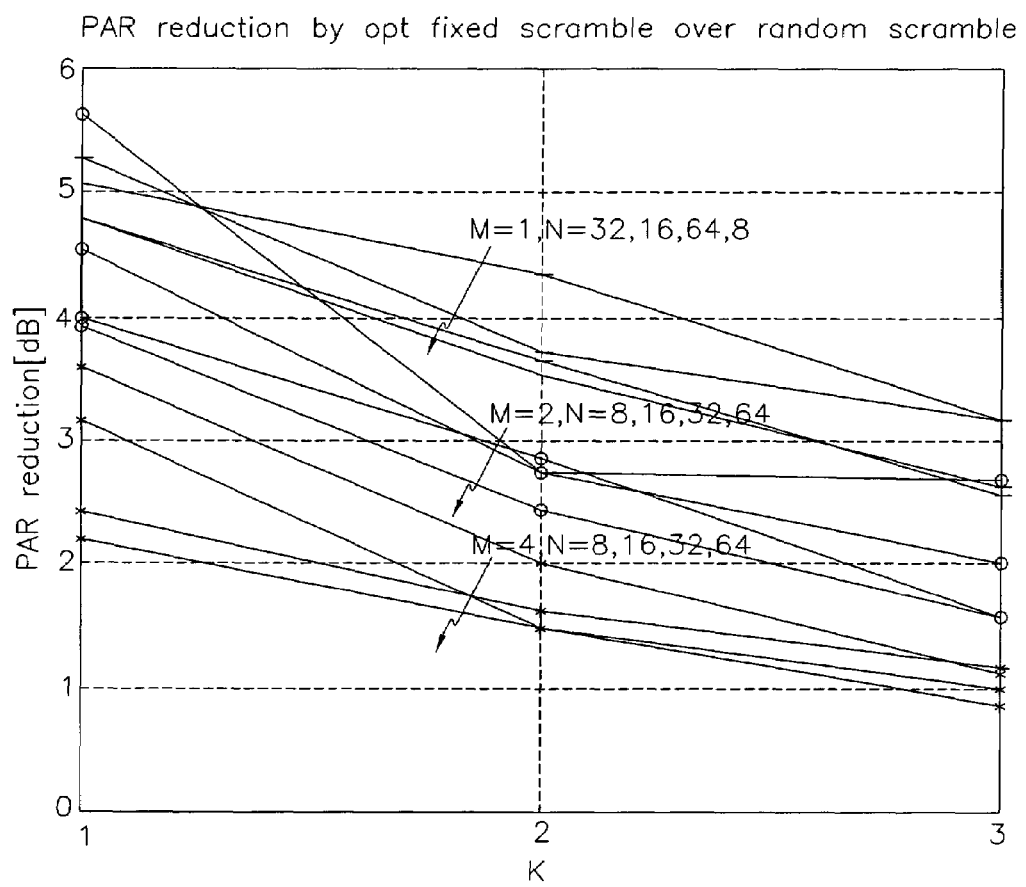
FIG. 5 shows a graph of performance differences between a fixed scrambling code and an unfixed random scrambling code according to various system variables.

FIG. 5 shows a graph for illustrating performance differences of the PAPR between the fixed scrambling code and the unfixed random scrambling code for various cases of system variables.

FIG. 5 shows reduced PAPRo values by differing the number of users K, the degrees of the orthogonal codes N, and the number of the concurrent transmission symbols M, and the reduced PAPRo values are obtained by subtracting the PAPRo [dB] of the pattern of the optimal fixed scrambling code from the PAPRo [dB] of the unfixed random scrambling code.

As shown, the fewer the users are, the greater the performance difference becomes, and the PAPR may be reduced by more than 5 dB by using an optimized fixed scrambling code when the number of the users is 1.

In the preferred embodiment of the present invention, a sub-optimized fixed scrambling code could be used so as not to convert the scrambling patterns according to the user's orthogonal code combinations, thereby greatly reducing complexity of the system.

In particular, the fewer the users are, the more the PAPR is greatly reduced compared to the conventional unfixed scrambling code method.

The scrambling system and method in MC-CDMA, and a recording medium storing the corresponding program according to the preferred embodiment of the present invention, convert the scrambling codes according to the users' orthogonal code combinations irrespective of user data, thereby easily reducing the PAPR.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A communication system in multicarrier code division multiple access (MC-CDMA), comprising:
    a transmitter for receiving a bit stream of at least one user having an orthogonal code combination, using a fixed scrambling code which is predetermined according to the user's orthogonal code combination or the number of users, generating multicarrier signals, and outputting the multicarrier signals; and
    a receiver for using a scrambling code matched with the scrambling code used by the transmitter, and receiving the multicarrier signals from the transmitter.

2. The communication system of claim 1, wherein the transmitter multiplies the scrambling code by each subcarrier, and wherein the scrambling code uses a predetermined pattern established according to the user's orthogonal code combination and it is fixed while the user's orthogonal code combination is maintained.

3. The communication system of claim 1, wherein the transmitter comprises:
    a symbol modulator for receiving the bit stream of the at least one user, and modulating the same according to a modulation method determined by the system;
    a multiplier for multiplying respective modulation symbols generated by the symbol modulator by an orthogonal code $C_k$ having an N chip length, and spreading them into chip sequences;
    an adder for adding the chip sequences spread by the multiplier in synchronization with symbol timing;
    an interleaver for interleaving the chip sequences of M symbols added by the adder and arranging the chips belonging to an identical symbol by an M chip interval;
    a serial/parallel converter for converting the chip sequences of the symbols arranged by the interleaver into parallel chip signals with a size identical to the number of subcarriers;
    a scrambling chip vector generator for providing scrambling codes having a length identical with the number of subcarriers to the parallel chip signals of the serial/parallel converter, multiplying them chip by chip and outputting scrambled chip signals;
    an inverse fast Fourier transformer (IFFT) for performing inverse fast Fourier transform for the scrambled chip signals; and
    a signal generator for generating baseband multicarrier signals from the outputs of the IFFT.

4. The communication system of claim 3, wherein the scrambling chip vector generator includes a multiplier for multiplying the parallel chip signals of the serial/parallel converter by the scrambling codes.

5. The communication system of claim 3, wherein the signal generator comprises:
    a parallel/serial converter for converting the parallel chip signals converted by the IFFT into serial chip signals; and
    a guard time inserter for inserting guard time into the serial chip signals converted by the parallel/serial converter.

6. The communication system of claim 1, wherein the scrambling code satisfies a condition for minimizing a peak-to-average power ratio performance measure(PAPR), and peak-to-average power ratio ($PAPR_0$) which is defined according to the equation:

$$Pr\left\{ \frac{\max\limits_{0 \le t < T_s} |y(t)|^2}{E(|y(t)|^2)} > PAPR_0 \right\} = P_0$$

where y(t) is an output signal of the transmitter, $T_s$ is a symbol period, and Po is an output signal clipping probability which is specified according to the communication system requirement.

7. The communication system of claim 1, wherein the transmitter finds a fixed scrambling pattern for maintaining its peak-to-average power ratio to be a minimum value for a current user's orthogonal code combination, and uses the scrambling code while the current user's orthogonal code combination is maintained.

8. The communication system of claim 7, wherein the fixed scrambling pattern is selected as a single scrambling pattern that has a value close to the peak-to-average power ratio caused by scrambling patterns which are optimized at each code combination over all code combinations before operating the communication system.

9. A communication method in multicarrier code division multiple access (MC-CDMA), comprising:
    (a-1) modulating a bit stream of at least one user having an orthogonal code combination into modulation symbols, multiplying the respective modulation symbols by an orthogonal code $C_k$, and spreading them into chip sequences;
    (a-2) adding the chip sequences spread by said modulating in synchronization with symbol timing, interleaving the chip sequences of M symbols that will be transmitted in parallel, and arranging the chips belonging to an identical symbol by an M chip interval; and (a-3) converting the chip sequences arranged by said adding into parallel chip signals having a number of subcarriers, multiplying the parallel chip signals by a fixed scrambling code which is predetermined according to the at least one user's orthogonal code combination, modulating each chip for each subcarrier through inverse fast Fourier transform, and generating and outputting multicarrier signals.

10. The communication method of claim 9, wherein the scrambling code is multiplied by each subcarrier in (a-3) and uses a predetermined pattern established according to a current user's orthogonal code combination which is fixed while the current user's orthogonal code combination is maintained.

11. The communication method of claim 9, wherein the generation of the multicarrier signals by said converting comprises multiplying the scrambling code by the parallel chip signals.

12. The communication method of claim 9, wherein the scrambling code satisfies a condition for minimizing a peak-to-average power ratio performance measure (PAPR), and peak-to-average power ratio ($PAPR_O$) which is defined according to the equation:

$$Pr\left\{\frac{\max_{0 \leq t < T_s} |y(t)|^2}{E(|y(t)|^2)} > PAPR_0\right\} = P_0$$

where y(t) is an output signal of a transmitter, $T_s$ is a symbol, and $P_0$ is an output signal clipping probability.

13. The communication method of claim 9, further comprising finding a fixed scrambling pattern for maintaining its peak-to-average power ratio to be a minimum value for the user's orthogonal code combination, and wherein the fixed scrambling pattern is used as the scrambling code.

14. The communication method of claim 13, wherein the fixed scrambling pattern is selected as a single scrambling pattern that has a value close to the peak-to-average power ratio.

15. A recording medium storing a program having instructions for causing a computer to execute a method comprising:

(a) modulating a bit stream of at least one user having an orthogonal code combination into modulation symbols, multiplying the respective modulation symbols by an orthogonal code $C_k$, and spreading them into chip sequences;

(b) adding the chip sequences spread in (a) in synchronization with symbol timing, interleaving the chip sequences of M symbols that will be transmitted in parallel, and arranging the chip sequences belonging to an identical symbol by an M chip interval; and (c) converting the chip sequences arranged in (b) into parallel chip sequence signals, multiplying the parallel chip signals by a fixed scrambling code which is predetermined according to the at least one user's orthogonal code combination, modulating each chip for each subcarrier through inverse fast Fourier transform, and generating and outputting multicarrier signals.

* * * * *